United States Patent
Miyamoto et al.

(10) Patent No.: US 12,311,950 B2
(45) Date of Patent: May 27, 2025

(54) MOTOR CONTROL DEVICE FOR ELECTRIC VEHICLE

(71) Applicant: MITSUBISHI JIDOSHA KOGYO KABUSHIKI KAISHA, Tokyo (JP)

(72) Inventors: Naoki Miyamoto, Tokyo (JP); Norihiko Ikoma, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 377 days.

(21) Appl. No.: 17/632,113

(22) PCT Filed: Oct. 13, 2020

(86) PCT No.: PCT/JP2020/038561
§ 371 (c)(1),
(2) Date: Feb. 1, 2022

(87) PCT Pub. No.: WO2021/075415
PCT Pub. Date: Apr. 22, 2021

(65) Prior Publication Data
US 2022/0274598 A1  Sep. 1, 2022

(30) Foreign Application Priority Data
Oct. 16, 2019  (JP) .................... 2019-189398

(51) Int. Cl.
*B60W 30/20* (2006.01)
*B60K 1/02* (2006.01)
(Continued)

(52) U.S. Cl.
CPC .......... *B60W 30/20* (2013.01); *B60L 15/20* (2013.01); *B60W 10/08* (2013.01); *B60W 10/16* (2013.01);
(Continued)

(58) Field of Classification Search
CPC ...... B60W 30/20; B60W 10/08; B60W 10/16; B60W 30/18145; B60W 2510/081;
(Continued)

(56) References Cited

U.S. PATENT DOCUMENTS 11,235,667 B1 * 2/2022 Kao ................. B60K 17/08
2002/0060545 A1 * 5/2002 Inagaki ............ H02P 25/098
318/629

(Continued)

FOREIGN PATENT DOCUMENTS

JP  2004147491 A * 5/2004 ............ B60K 6/365
JP  2007-161190 A  6/2007
(Continued)

OTHER PUBLICATIONS

Translation of JP-2004147491-A retrieved on Feb. 7, 2024 from Espacenet (Year: 2024).*
(Continued)

*Primary Examiner* — Thomas Ingram
*Assistant Examiner* — Faris Asim Shaikh
(74) *Attorney, Agent, or Firm* — BIRCH, STEWART, KOLASH & BIRCH, LLP

(57) ABSTRACT

A motor control device for an electric vehicle, which includes a power transmission path configured such that an output of a first motor and an output of a second motor are, respectively, transmittable to left and right wheels of the vehicle via a differential mechanism, includes a non-interference correction part for predictively correcting an output from a first motor control part or a second motor control part to an opposite motor to a motor performing vibration suppression correction via the power transmission path, such that a change in motor output by a vibration suppression correction torque amount cancels an interference torque interfering with a motor output of the opposite motor.

6 Claims, 8 Drawing Sheets

(51) Int. Cl.
*B60L 15/20* (2006.01)
*B60W 10/08* (2006.01)
*B60W 10/16* (2012.01)
*B60W 30/18* (2012.01)
*B62D 11/00* (2006.01)

(52) U.S. Cl.
CPC .......... *B60K 1/02* (2013.01); *B60W 30/18145* (2013.01); *B60W 2510/081* (2013.01); *B60W 2510/1005* (2013.01); *B60W 2710/083* (2013.01); *B60W 2710/12* (2013.01); *B62D 11/003* (2013.01)

(58) Field of Classification Search
CPC ... B60W 2510/1005; B60W 2710/083; B60W 2710/12; B60W 2710/08; B60W 2510/083; B60W 2510/08; B60W 2050/0008; B60L 15/20; B60L 2260/42; B60L 15/2036; B60L 2220/42; B60L 2220/46; B60L 2240/423; B60L 2240/463; B60L 2240/486; B60L 2270/145; B60L 15/2054; B60K 1/02; Y10S 903/917; Y10S 903/915; Y02T 10/72; Y02T 10/62; H02P 23/04; H02P 21/05; H02P 6/10; H02P 6/08; H02P 5/00; H02P 5/46; H02P 5/74; H02P 5/68; H02P 5/50; H02P 5/51; H02P 2205/00; H02P 2205/05; F16H 57/0006; B60Y 2200/92; B62D 11/003
See application file for complete search history.

(56) References Cited

U.S. PATENT DOCUMENTS

| | | | | |
|---|---|---|---|---|
| 2003/0029653 | A1* | 2/2003 | Fujikawa | B60W 30/18027 903/910 |
| 2005/0247503 | A1* | 11/2005 | Imazu | B60K 6/365 180/300 |
| 2009/0038866 | A1* | 2/2009 | Abe | F16H 48/36 180/65.7 |
| 2010/0244755 | A1* | 9/2010 | Kinugasa | H02P 21/05 180/65.285 |
| 2011/0213533 | A1* | 9/2011 | Ueoka | B60K 6/547 701/66 |
| 2012/0053790 | A1* | 3/2012 | Oikawa | B60K 6/365 903/902 |
| 2012/0239237 | A1* | 9/2012 | Hashimoto | B60W 30/20 180/65.265 |
| 2015/0180386 | A1* | 6/2015 | Enoki | H02P 6/10 318/400.23 |
| 2015/0367832 | A1* | 12/2015 | Oshiumi | B60W 30/1846 903/910 |
| 2016/0226409 | A1* | 8/2016 | Ogawa | H02P 27/085 |
| 2017/0129474 | A1* | 5/2017 | Sato | B60L 50/16 |
| 2020/0259431 | A1* | 8/2020 | Sawada | H02P 5/46 |
| 2022/0355788 | A1* | 11/2022 | Kagaya | B60L 15/2054 |

FOREIGN PATENT DOCUMENTS

| | | | | |
|---|---|---|---|---|
| JP | 2008295173 A | * | 12/2008 | ............... B60K 1/02 |
| JP | 4637136 B2 | | 2/2011 | |
| JP | 4907390 B2 | | 3/2012 | |
| JP | 2019103249 A | * | 6/2019 | |
| JP | 2020029168 A | * | 2/2020 | ............... B26D 3/12 |

OTHER PUBLICATIONS

Translation of JP-2008295173-A retrieved on Feb. 7, 2024 from Espacenet (Year: 2024).*
Translation of JP-2019103249-A retrieved on Feb. 7, 2024 from Espacenet (Year: 2024).*
Translation of JP-2020029168-A retrieved on Feb. 7, 2024 from Espacenet (Year: 2024).*
International Search Report for PCT/JP2020/038561 mailed on Dec. 22, 2020.
Written Opinion of the International Searching Authority for PCT/JP2020/038561 mailed on Dec. 22, 2020.
International Preliminary Report on Patentability mailed on Apr. 28, 2022 in corresponding International PCT Application No. PCT/JP2020/038561.

* cited by examiner

MOTOR CONTROL DEVICE FOR ELECTRIC VEHICLE

TECHNICAL FIELD

The present disclosure relates to a motor control device for a pair of left and right motors for driving a pair of left and right wheels in an electric car or an electric vehicle of a hybrid vehicle having a motor for driving wheels.

BACKGROUND

Conventionally, as described in Patent Document 1, a technique of individually controlling a driving force of a left wheel and a driving force of a right wheel by two motors mounted on a vehicle is known. That is, the above-described technique improves turning performance or vehicle body stability by individually controlling the driving forces of the left and right wheels. The left and right motors is, respectively, be connected to the left and right wheels, allowing driving force transmission paths of the left and right wheels to be independent of each other.

Further, as described in Patent Document 2 or Patent Document 3, a vehicle is also developed which includes a power transmission path capable of adjusting a transmission ratio of a driving force to left and right wheels by coupling driving force transmission paths of the left and right wheels with a differential mechanism, while connecting two motors to the left and right wheels, respectively. With such structure, it is possible to passively distribute a torque (absorb a difference in driving torque between the left and right wheels) and to actively distribute a torque (distribute the driving torque to the left and right wheels), in accordance with a running condition.

CITATION LIST

Patent Literature

Patent Document 1: JP2007-161190A
Patent Document 2: JP4907390B
Patent Document 3: JP4637136B

SUMMARY

Technical Problem

In a motor control unit for controlling driving torques of left and right wheels, in order to reduce torque ripple (torque variation during rotation) caused by a motor and to suppress a torsional vibration of a drive shaft coupled to the left and right wheels (suppress a vibration near a natural vibration frequency according to the rigidity of the drive shaft), vibration suppression control is performed where an excessive fluctuation in motor rotation speed is suppressed by correcting a torque adjustment amount with respect to a running request torque needed for running.

Therefore, in a vehicle where the left and right wheels can operate independently of each other, the vibration suppression control is possible by independently performing the vibration suppression control for each of motor control units of the left and right wheels. However, in the electric vehicle which includes the power transmission path capable of adjusting the transmission ratio of the driving force to the left and right wheels by coupling the driving force transmission paths of the left and right wheels with the differential mechanism, while connecting the two motors to the left and right wheels, respectively, since left and right motor torques are transmitted to the left and right wheels via the driving force transmission path, the one motor torque may interfere with the opposite motor torque. For example, the interference occurs such that the one motor torque cancels the opposite motor torque.

Thus, due to the interference of the motor torque for the vibration suppression control on the one motor (the motor torque after vibration suppression correction) with the other motor torque, for example, in a case where the vibration suppression correction is performed by feedback control based on its own motor rotation speed, the vibration suppression correction is repeated such that the other interfered motor performs the vibration suppression control by feedback control based on the motor rotation speed after the interference, the motor torque of the one motor is interfered again by the other motor torque after the vibration correction, and the one motor torque is corrected again by feedback control, resulting in divergence of a torque operation amount without convergence. Consequently, the problem arises in that the vibration suppression control cannot be exerted or a vehicle behavior becomes unstable.

Further, to deal with the divergence of the torque operation amount due to the mutual interference described above, it is considered that the influence of the mutual interference is weakened by reducing a gain of the feedback control based on the motor rotation speed or imposing a restriction on the vibration suppression correction torque amount by setting a limiter. However, the problem arises in that a vibration suppression effect is reduced.

In view of the above problems, an object of at least one embodiment of the present invention is to provide a motor control device which is capable of effectively exerting, in the electric vehicle which includes the power transmission path configured such that an output of the first motor and an output of the second motor are, respectively, transmittable to the left and right wheels of the vehicle via the differential mechanism, the vibration suppression control of preventing mutual interference, where a correction torque for suppressing vibrations of the respective motors interferes with the output of the other motor, to suppress the excessive fluctuation in motor rotation speed.

Solution to Problem (1) Invented in order to achieve the aforementioned object, according to at least one embodiment of the present invention, a motor control device for an electric vehicle, which includes a power transmission path configured such that an output of a first motor and an output of a second motor are, respectively, transmittable to left and right wheels of the vehicle via a differential mechanism, includes a first motor control part for controlling the output of the first motor, a second motor control part for controlling the output of the second motor, a first motor vibration suppression part for calculating a vibration suppression correction torque amount for vibration suppression of the first motor to correct an output from the first motor control part, and a second motor vibration suppression part for calculating a vibration suppression correction torque amount for vibration suppression of the second motor to correct an output from the second motor control part. The motor control device for the electric vehicle further includes a non-interference correction part for predictively correcting the output from the first motor control part or the second motor control part to an opposite motor to a motor performing vibration suppression correction via the power transmission path, such that a change in motor output by the vibration suppression correction torque amount cancels an interference torque interfering with a motor output of the opposite motor.

With the above configuration, the non-interference correction part prevents the change in motor output by the correction torque amount for vibration suppression control with respect to one of the first motor or the second motor from interfering with the output from the other motor via the power transmission path and influencing feedback control for vibration suppression of the other motor, for example, vibration suppression control of giving feedback about the rotation speed of the other motor. That is, non-interference is performed by predictively correcting the output from the motor control part for controlling the interfered motor output to the output for canceling the interference torque affecting in the power transmission path. Thus, it is possible to solve the problem that the vibration suppression control cannot be exerted due to divergence of the torque operation amount for vibration suppression of the first motor and the second motor, and the problem that the vehicle behavior becomes unstable due to divergence of the torque operation amount.

(2) In some embodiments, the power transmission path constitutes a turning moment control device capable of controlling a turning moment by controlling the respective outputs of the first motor and the second motor to adjust a sharing ratio of a driving torque in the left and right wheels.

With the above configuration, also in the electric vehicle which includes the turning moment control device for stabilizing the vehicle posture by adjusting the magnitude of the turning moment of the vehicle, it is possible to effectively achieve the vibration suppression control of suppressing the excessive fluctuation in motor rotation speed.

(3) In some embodiments, the non-interference correction part includes a first non-interference part for predictively correcting the output of the first motor control part when the motor output of the second motor is changed by the vibration suppression correction torque amount, and a second non-interference part for predictively correcting the output of the second motor control part when the motor output of the first motor is changed by the vibration suppression correction torque amount.

With the above configuration, with the first non-interference part for predictively correcting the output of the first motor control part and the second non-interference part for predictively correcting the output of the second motor control part, it is possible to prevent mutual interference between the vibration suppression control of the first motor and the vibration suppression control of the second motor.

(4) In some embodiments, if an interference, where the output of the first motor decreases by a torque amount obtained by integrating a predetermined interference coefficient to the vibration suppression correction torque amount with an increase in the output of the second motor by the vibration suppression correction torque amount, is performed via the power transmission path, the first non-interference part predictively corrects the output of the first motor control part in advance such that the output of the first motor increases by the decreasing torque amount, and if an interference, where the output of the second motor decreases by a torque amount obtained by integrating a predetermined interference coefficient to the vibration suppression correction torque amount with an increase in the output of the first motor by the vibration suppression correction torque amount, is performed via the power transmission path, the second non-interference part predictively corrects the output of the second motor control part in advance such that the output of the second motor increases by the decreasing torque amount.

With the above configuration, since the interference, where the outputs of the first motor and the second motor each decrease by the torque amount obtained by integrating the predetermined interference coefficient to the vibration suppression correction torque amount with the increase in the output of the opposite motor by the vibration suppression correction torque amount, is performed on the opposite motor via the power transmission path, the first non-interference part and the second non-interference part perform prediction control to add the torque amount decreasing due to the interference to the opposite motor in advance, thereby making it possible to easily perform non-interference.

(5) In some embodiments, the predetermined interference coefficient is calculated based on a gear ratio which is formed by a gear train constituting the power transmission path.

With the above configuration, since the predetermined interference coefficient integrated to the vibration suppression correction torque amount is calculated based on the gear ratio which is formed by the gear train constituting the power transmission path, it is possible to easily set the predetermined interference coefficient.

(6) In some embodiments, the first motor vibration suppression part and the second motor vibration suppression part calculate the vibration suppression correction torque amount of the first motor and the vibration suppression correction torque amount of the second motor by feedback control based on a rotation speed of the first motor and a rotation speed of the second motor, respectively.

With the above configuration, even if the vibration suppression correction torque amounts of the first motor and the second motor are calculated by feedback control based on the rotation speeds of the motors, the rotation speed of the own motor is not interfered by the vibration suppression correction torque amount of the other motor, making it possible to improve stability of the vibration suppression control.

Advantageous Effects

According to at least one embodiment of the present invention, it is possible to effectively exert vibration suppression control of preventing mutual interference, where a correction torque for suppressing vibrations of a first motor and a second motor interferes with an output of the other motor, to suppress an excessive fluctuation in motor rotation speed.

DETAILED DESCRIPTION

Figure 1:
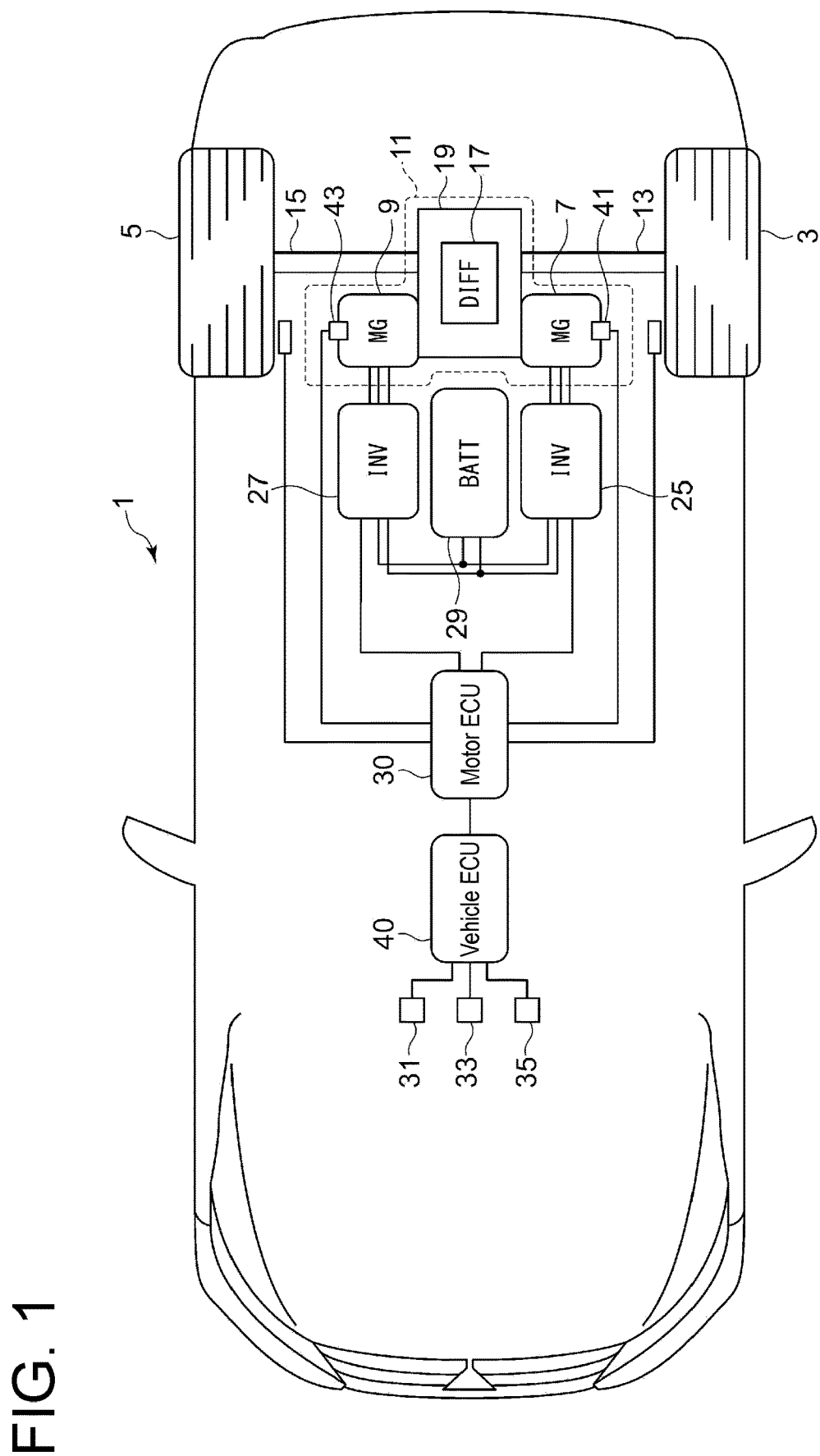
FIG. 1 is a block diagram showing the overall configuration of an electric vehicle to which a motor control device is applied according to an embodiment of the present invention.

Embodiments of the present invention will now be described in detail with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present invention.

FIG. 1 is a block diagram showing the overall configuration of an electric vehicle to which a motor control device is applied according to an embodiment of the present invention. A vehicle 1 is an electric car or an electric vehicle of a hybrid vehicle having a motor for driving wheels, and is an electric car where left and right wheels 3, 5 on a rear wheel side are driven by a pair of left and right motors 7, 9, respectively. The vehicle 1 may be a four-wheel-drive vehicle where a front wheel side is driven by a drive motor, or may be a two-wheel-drive vehicle where the front wheel side is not driven.

The vehicle 1 is equipped with a turning moment control device 11 having an active yaw control (AYC) function. The turning moment control device 11 is interposed between a left axle 13 coupled to the left wheel 3 and a right axle 15 coupled to the right wheel 5.

The AYC function is a function of adjusting the magnitude of a yaw moment (turning moment) by proactively controlling the sharing ratio of a driving torque in the left and right wheels 3, 5 to stabilize the posture of the vehicle 1 in a yaw direction. The turning moment control device 11 of the present embodiment has not only the AYC function, but also a function of transmitting a driving force to the left and right wheels 3, 5 to run the vehicle 1 and a function of absorbing a difference in rotation speed between the left and right wheels 3, 5 which is made in turning of the vehicle 1.

Figure 3:
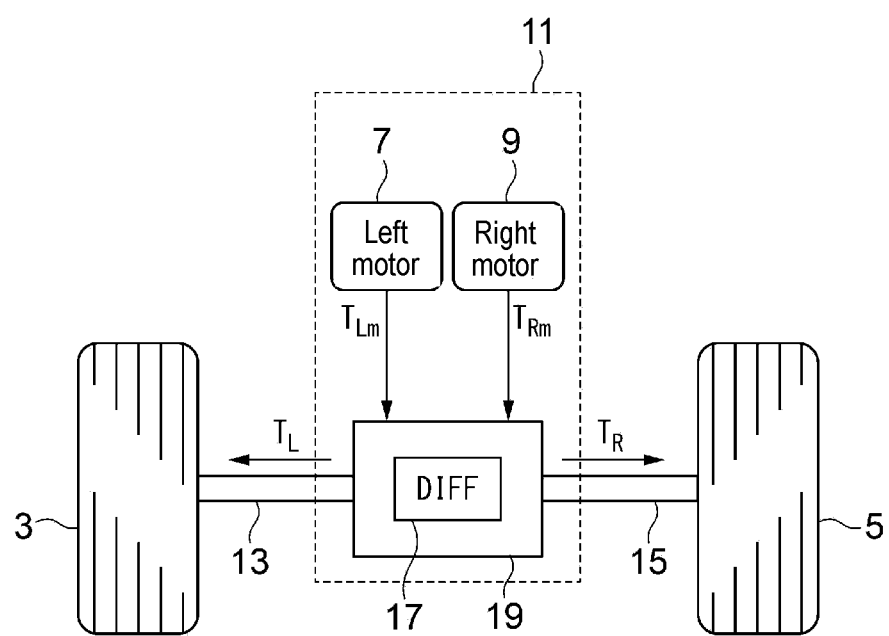
FIG. 3 is a conceptual view showing that motor torques of left and right motors flow to left and right wheels, respectively.

As shown in FIG. 3, the turning moment control device 11 includes the pair of left and right motors 7, 9 one of which is the left motor (first motor) 7 for mainly transmitting the driving force to the left wheel 3 via the left axle 13 and the other of which is the right motor (second motor) 9 for mainly transmitting the driving force to the right wheel 5 via the right axle 15. The left motor 7 and the right motor 9 are each a motor generator (MG) having a function as an engine and a function as a generator.

Further, the turning moment control device 11 includes a power transmission path 19 that includes a gear engagement path (gear train) for transmitting motor torques $T_{Rm}$, $T_{Lm}$ from the left motor 7 and the right motor 9 to the left axle 13 of the left wheel 3 and the right axle 15 of the right wheel 5, respectively, and includes a differential mechanism (DIFF) 17 capable of moving a driving torque between the left axle 13 and the right axle 15.

Figure 4:
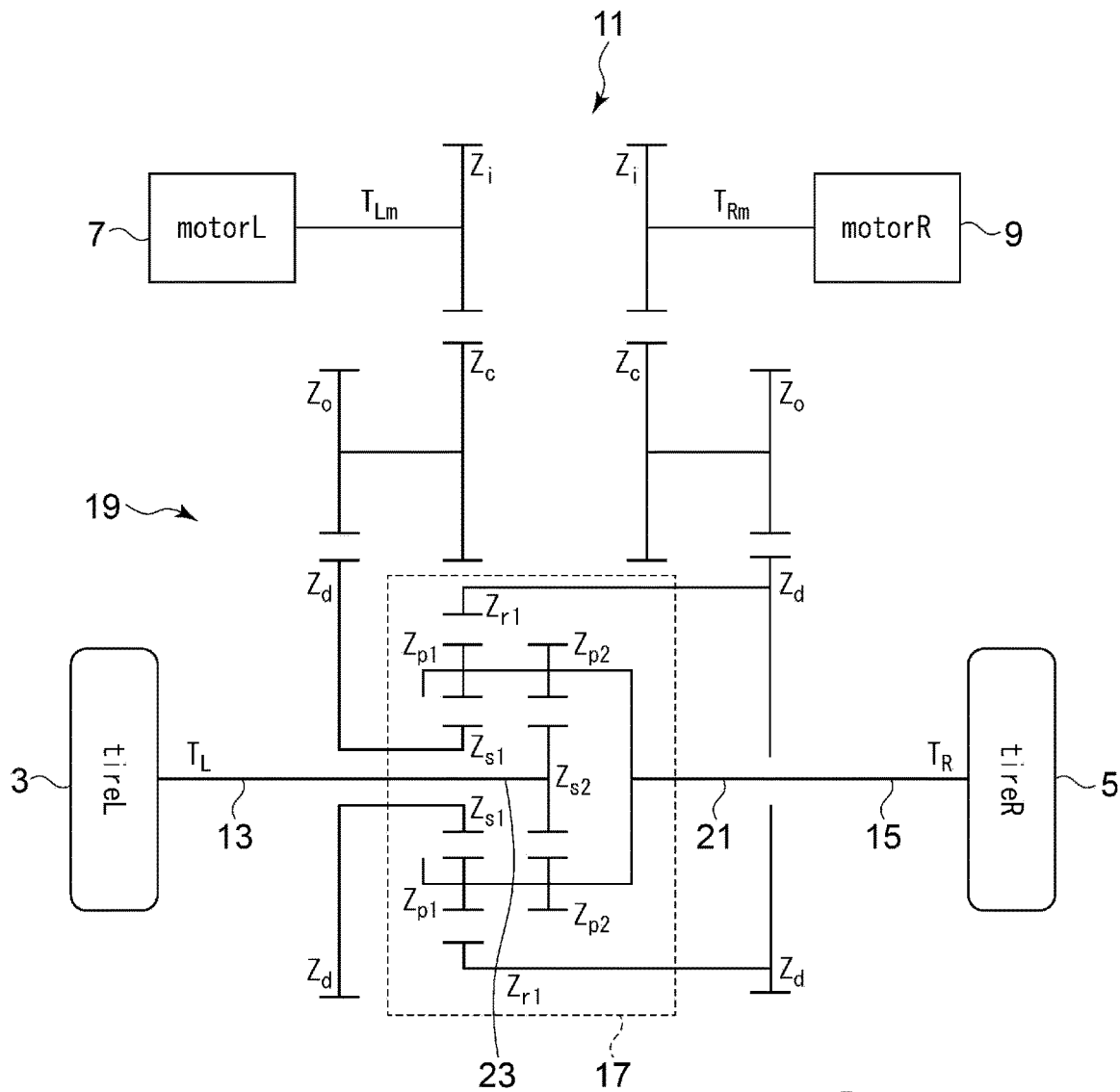
FIG. 4 is a skeleton view showing a power transmission path of a turning moment control device.

FIG. 4 is a skeleton view showing an example of the configuration of the turning moment control device 11 and shows the power transmission path 19. Output shafts of the left motor 7 and the right motor 9 are, respectively, connected to differential drive gears Zd via a reduction gear train formed by input gears Zi, counter gears Zc, and output gears Zo. The differential drive gears Zd on the side of the left motor 7 are connected to I/P sun gears Zs1 of a planetary gear mechanism constituting the differential mechanism 17, and the differential drive gears Zd on the side of the right motor 9 are connected to annulus gears Zr1 of the planetary gear mechanism constituting the differential mechanism 17.

Each large pinion gear Zp1 of a planetary gear interposed between a corresponding one of the annulus gears Zr1 and a corresponding one of the I/P sun gears Zs1 of the planetary gear mechanism in meshing engagement and a small pinion gear Zp2 disposed side by side with the large pinion gear Zp1 are rotatably supported by a common carrier C, and a rotation center shaft 21 of the carrier C is connected to the right axle 15. Further, a rotation center shaft 23 of an O/P sun gear Zs2 in meshing engagement on the inner side of the small pinion gears Zp2 is connected to the left axle 13. The power transmission path 19 shown in the skeleton view of FIG. 4 constitutes a torque difference amplified torque vectoring device.

Figure 5:
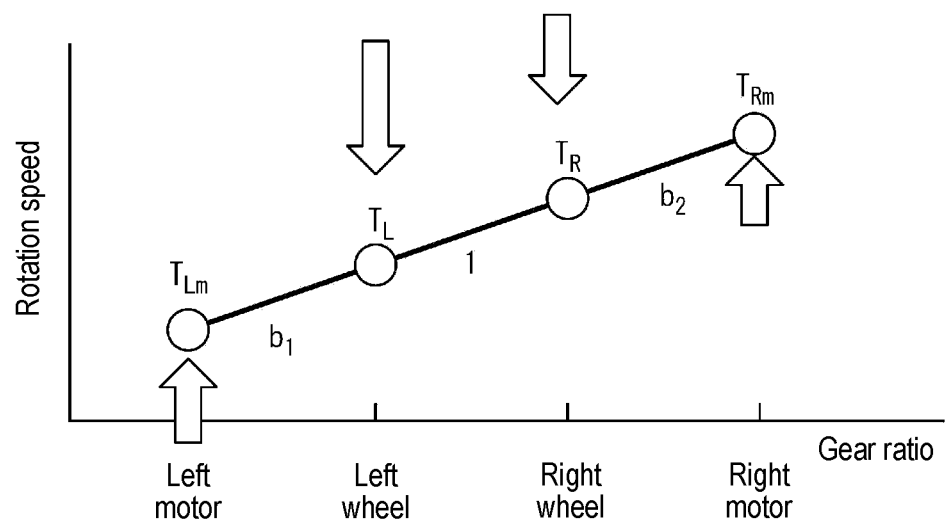
FIG. 5 is a collinear graph showing a collinear relationship of a rotation speed among respective elements, namely, a left motor, a left wheel, a right wheel, and a right motor in the power transmission path shown in FIG. 4.

In the power transmission path 19 configured as described above, as in a collinear graph shown in FIG. 5, rotation speeds of the left motor 7, the left wheel 3, the right wheel 5, and the right motor 9 have a collinear relationship where they are positioned on the same straight line. The collinear graph shown in FIG. 5 represents, at the abscissa, the left motor 7, the left wheel 3, the right wheel 5, and the right motor 9 in sequence at intervals of a gear ratio of the gears constituting sections between the respective elements, and represents the respective rotation speeds at the ordinate. Further, FIG. 5 represents a state where the vehicle 1 turns left and the rotation speed of the right wheel 5 is higher than the rotation speed of the left wheel 3.

The configuration of the power transmission path 19 shown in the skeleton view of FIG. 4 is merely an example, and the structure will suffice in which the rotation speeds of the left motor 7, the left wheel 3, the right wheel 5, and the right motor 9 have the collinear relationship where they are positioned on the same straight line, as in the collinear graph of FIG. 5.

Operating states of the left motor 7 and the right motor 9 are controlled by a left inverter (INV) 25 and a right inverter 27, respectively. The left inverter 25 and the right inverter 27 are converters (DC-AC inverters) for converting DC power supplied from a battery (BATT) 29 into AC current to be supplied to the left motor 7 and the right motor 9, respectively. Each inverter 25, 27 includes a built-in three-phase bridge circuit including a plurality of switching elements. AC power is generated by intermittently switching connection statuses of the respective switching elements. Further, the output (driving torque) or the rotation speed of each motor 7, 9 is adjusted by controlling a switching frequency or an output voltage. Operations of the left motor 7 and the right motor 9 are controlled by a motor ECU (motor control device) 30 via the left inverter 25 and the right inverter 27, respectively.

Figure 2:
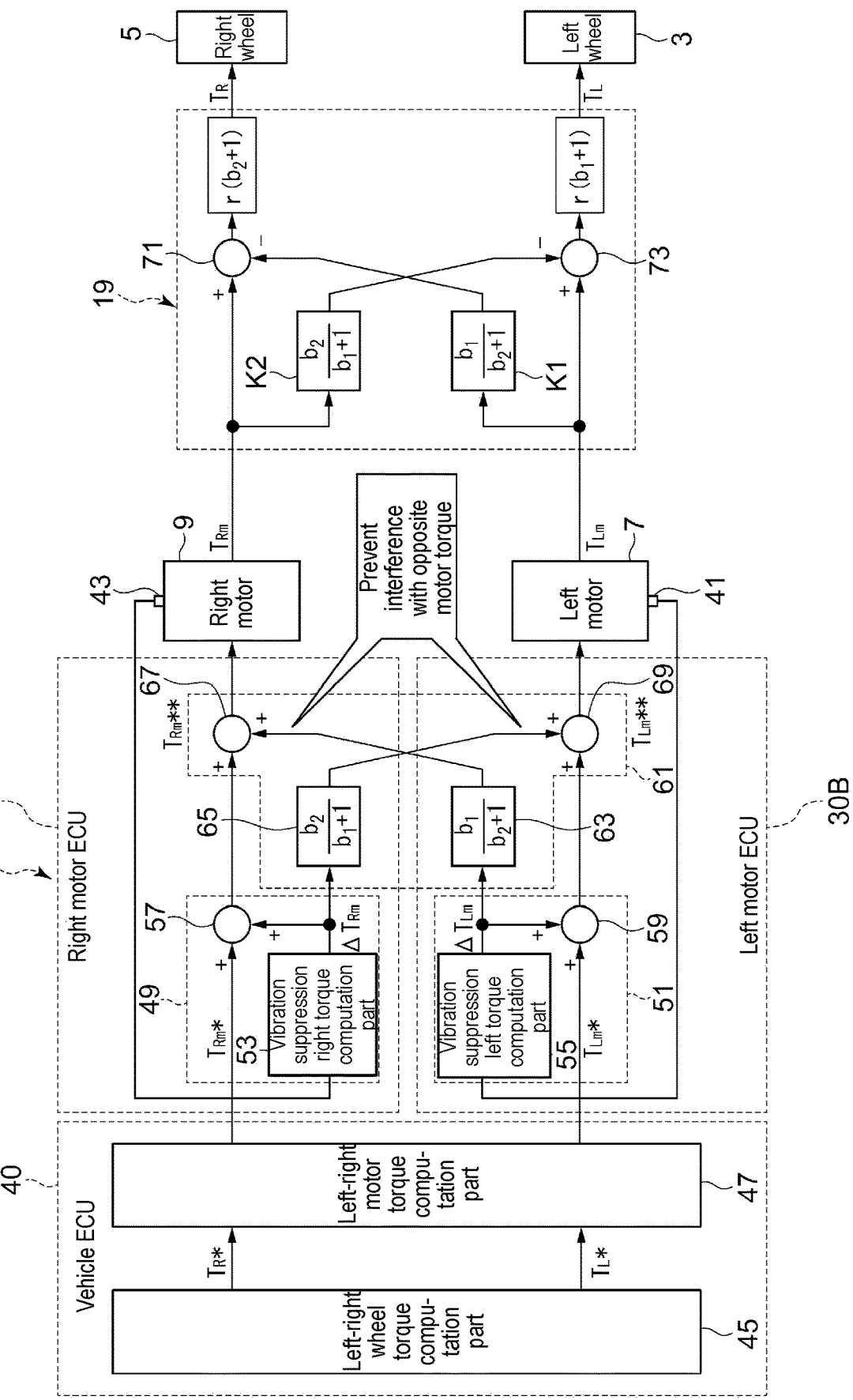
FIG. 2 is a block diagram showing the overall configuration including the configuration of the motor control device.

As shown in FIG. 2, the motor ECU 30 causes a vehicle ECU (vehicle control device) 40 to calculate request driving torques of the left and right wheels 3, 5 and the left and right motors 7, 9 from a running request status of a driver, and controls the operations of the left and right motors 7, 9 based on the request driving torques of the left and right motors 7, 9. The request running condition of the driver receives a signal from an accelerator pedal position sensor 31 operated by the driver, a signal from a vehicle speed sensor 33 for detecting a vehicle speed, a signal from a steering angle sensor 35 for detecting a steering angle of a steering operated by the driver, or signals from other various sensors, and determines the running request status of the driver.

Further, the left motor 7 and the right motor 9 include built-in resolvers or encoders serving as a left rotation speed sensor 41 and a right rotation speed sensor 43, respectively. The signals from the left and right rotation speed sensors 41, 43 are inputted to the motor ECU 30.

FIG. 2 is an overall configuration block diagram schematically showing the configurations of the vehicle ECU 40, the motor ECU 30, and the power transmission path 19.

In FIG. 2, the vehicle ECU 40 includes a left-right wheel torque computation part 45 and a left-right motor torque computation part 47. The left-right wheel torque computation part 45 mainly receives the signal from the accelerator pedal position sensor 31 operated by the driver, the signal from the vehicle speed sensor 33, or the signal from the steering angle sensor 35 to determine the running request status of the driver as described above, and computes wheel request torques $T_R^*$, $T_L^*$ of the left and right wheels 3, 5 according to the running request of the driver. The left-right motor torque computation part 47 computes motor request torques $T_{Rm}^*$, $T_{Lm}^*$ of the left and right motors 7, 9 from the wheel request torques $T_R^*$, $T_L^*$ of the left and right wheels 3, 5, and outputs the motor request torques $T_{Rm}^*$, $T_{Lm}^*$ to the motor ECU 30.

Further, the motor ECU 30 includes a right motor ECU (first motor control part) 30A for controlling the right motor 9, and a left motor ECU (second motor control part) 30B for controlling the left motor 7. A request value of the right motor request torque $T_{Rm}^*$ from the vehicle ECU 40 is input to the right motor ECU 30A, and a request value of the left motor request torque $T_{Lm}^*$ from the vehicle ECU 40 is input to the left motor ECU 30B.

In motor ECU 30, the right motor request torque $T_{Rm}^*$ and the left motor request torque $T_{Lm}^*$ from the vehicle ECU 40 are, respectively, corrected in two stages to output a request value $T_{Rm}^{}$ of the right motor request torque and a request value $T_{Lm}^{}$ of the left motor request torque to the right motor 9 and the left motor 7, respectively.

As the first-stage correction, the motor ECU 30 includes a right motor vibration suppression part (first motor vibration suppression part) 49 and a left motor vibration suppression part (second motor vibration suppression part) 51. The right motor vibration suppression part (first motor vibration suppression part) 49 calculates a vibration suppression correction torque amount $\Delta T_{Rm}$ for vibration suppression of the right motor 9 to correct an output from the right motor ECU30A to the right motor 9. The left motor vibration suppression part (second motor vibration suppression part) 51 calculates a vibration suppression correction torque amount $\Delta T_{Lm}$ for vibration suppression of the left motor 7 to correct an output from the left motor ECU30B to the left motor 7.

The calculation of the vibration suppression correction torque amount $\Delta T_{Rm}$ in the right motor vibration suppression part 49 is performed by a vibration suppression right torque computation part 53, and the calculation of the vibration suppression correction torque amount $\Delta T_{Lm}$ in the left motor vibration suppression part 51 is performed by a vibration suppression left torque computation part 55.

In computation by the vibration suppression right torque computation part 53 and the vibration suppression left torque computation part 55, for example, the right rotation speed sensor 43 detects the rotation speed of the right motor 9, the left rotation speed sensor 41 detects the rotation speed of the left motor 7, in the vibration suppression right torque computation part 53, the vibration suppression correction torque amount $\Delta T_{Rm}$ is calculated by feedback control so that the rotation speed of the right motor 9 does not fluctuate beyond a predetermined range, and in the vibration suppression left torque computation part 55 alike, the vibration suppression correction torque amount $\Delta T_{Lm}$ is calculated by feedback control so that the rotation speed of the left motor 7 does not fluctuate beyond the predetermined range.

Then, in the right motor ECU 30A, the vibration suppression correction torque amount $\Delta T_{Rm}$ calculated by the vibration suppression right torque computation part 53 and the request value of the right motor request torque $T_{Rm}^*$ from the vehicle ECU 40 are input to an adder-subtractor 57, the vibration suppression correction torque amount $\Delta T_{Rm}$ is added to the request value of the right motor request torque $T_{Rm}^*$, and the request value of the right motor request torque $T_{Rm}^*$ is corrected.

Likewise, in the left motor ECU 30B as well, the vibration suppression correction torque amount $\Delta T_{Lm}$ calculated by the vibration suppression left torque computation part 55 and the request value of the left motor request torque $T_{Lm}^*$ from the vehicle ECU 40 are input to an adder-subtractor 59, the vibration suppression correction torque amount $\Delta T_{Lm}$ is added to the request value of the left motor request torque $T_{Lm}^*$, and the request value of the left motor request torque $T_{Lm}^*$ is corrected.

As the second-stage correction, as shown in FIG. 2, the motor ECU 30 includes a non-interference correction part 61 to connect the right motor ECU 30A and the left motor ECU 30B. The non-interference correction part 61 is a part for predictively correcting an output to an opposite motor to a motor performing vibration suppression correction via the power transmission path 19, such that a change in motor output by the vibration suppression correction torque amount cancels an interference torque interfering with a motor output of the opposite motor.

That is, a phenomenon occurs where, in the course of transmitting the motor outputs of the left and right motors 7, 9 to the left and right wheels 3, 5 via the power transmission path 19 constituting the turning moment control device 11, if the one motor output is increased, the other motor output is decreased by interference of the one motor output.

Thus, for example, in the vibration suppression right torque computation part 53, feedback control is performed on the vibration suppression correction torque amount $\Delta T_{Rm}$ based on the rotation speed signal from the right rotation speed sensor 43 of the right motor 9 so that the rotation speed of the right motor 9 does not fluctuate beyond the predetermined range, and in the vibration suppression left torque computation part 55 alike, feedback control is performed on the vibration suppression correction torque amount $\Delta T_{Lm}$ based on the rotation speed signal from the left rotation speed sensor 41 of the left motor 7 so that the rotation speed of the left motor 7 does not fluctuate beyond the predetermined range, causing the problem that the left and right motor outputs interfere with each other in the absence of the non-interference correction part 61.

Figure 7:
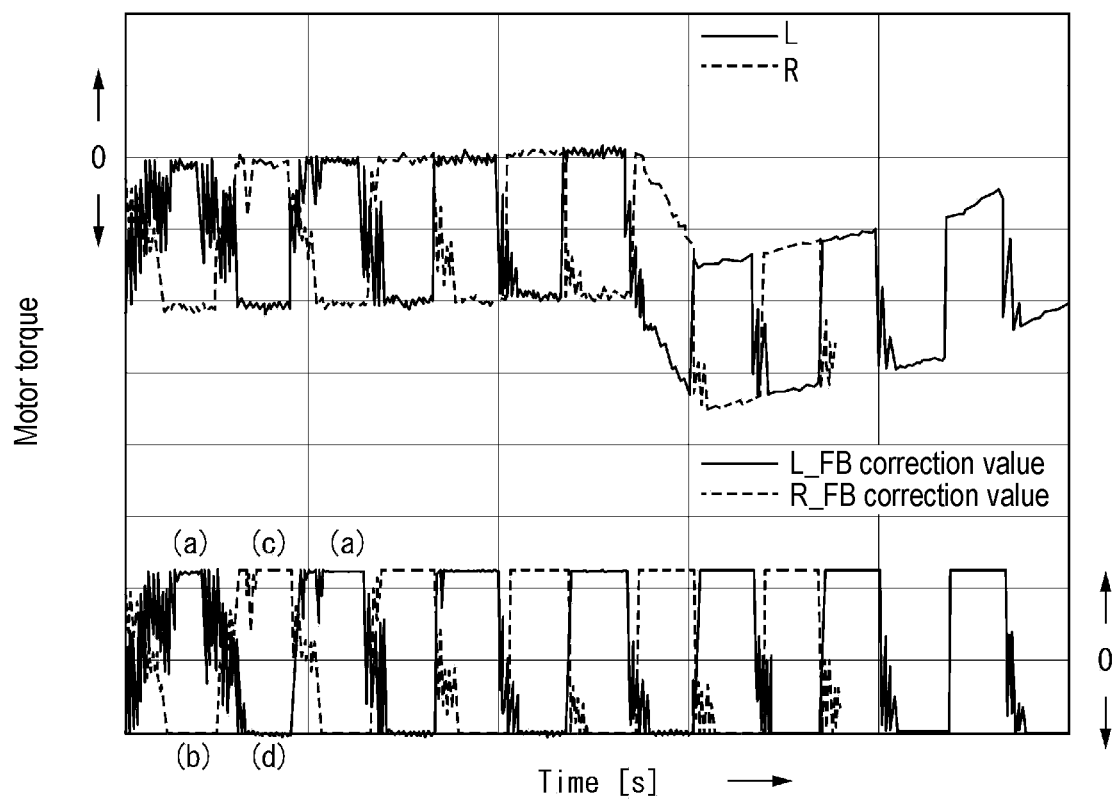
FIG. 7 is a characteristic graph showing a comparative example without a non-interference part and showing torque variations of the left and right motors.
Figure 8:
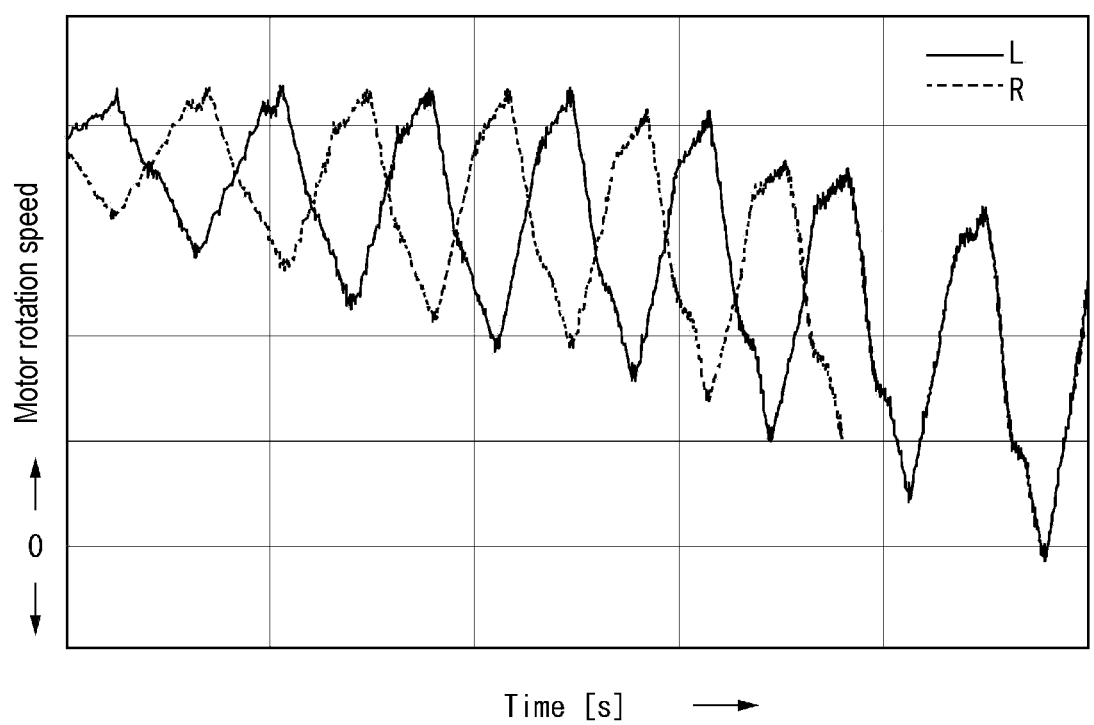
FIG. 8 is a characteristic graph showing the comparative example without the non-interference part as with FIG. 7 and showing fluctuations in rotation speed of the left and right motors.

The state of the above-described mutual interference is shown in FIG. 7, 8 as a comparative example. FIG. 7 represents a waveform of the motor torque on the upper side and a waveform of the vibration suppression correction torque which undergoes feedback correction based on the motor rotation speed on the lower side of the ordinate, and represents an elapsed time at the abscissa. Further, FIG. 8 represents a waveform of the motor rotation speed at the ordinate and represents an elapsed time at the abscissa. A case will be described in which the running condition of the vehicle 1 is a straightforward start condition without a torque difference between the left and right motors.

In FIG. 7, first, the left motor increases the correction torque for vibration suppression (a), and when the entire torque of the left motor increases, the correction torque of the right motor for vibration suppression decreases by suffering from the interference corresponding to the increase in correction torque of the left motor torque (b). Then, the rotation speed of the right motor decreases, increasing the correction torque for vibration suppression of the right motor (c). Then, next, the left motor torque decreases by suffering from the interference corresponding to the increase in correction torque of the right motor torque. Then, the left motor the left motor decreased in rotation speed returns to (a) described above to repeat the same operation. Further, FIG. 8 shows a state in which the rotation speeds of the left and right motors diverge due to the repeated increase/decrease in motor torque of the left and right motors as in FIG. 7.

In the present embodiment, the non-interference correction part 61 prevents the mutual interference of the left and right motor outputs, and prevents divergence of the torque operation amounts of the right motor 9 and the left motor 7, effectively achieving the respective vibration suppression controls of the right motor 9 and the left motor 7, as described above. Further, it is possible to solve the problem that the vehicle behavior becomes unstable.

As shown in FIG. 2, the configuration of the non-interference correction part 61 includes a right non-interference part (first non-interference part) 63 and a left non-interference part (second non-interference part) 65. The right non-interference part (first non-interference part) 63 predictively corrects the output of the right motor ECU 30A when the motor output of the left motor 7 is changed by the vibration suppression correction torque amount $\Delta T_{Lm}$. The left non-interference part (second non-interference part) 65 predictively corrects the output of the left motor ECU 30B when the motor output of the right motor 9 is changed by the vibration suppression correction torque amount $\Delta T_{Rm}$.

As shown in FIG. 2, an interference torque (K1 part of FIG. 2), where the output of the right motor 9 decreases by a torque amount obtained by integrating a predetermined interference coefficient (b1/(b2+1)) to the vibration suppression correction torque amount $\Delta T_{Lm}$ with an increase in the output $T_{Lm}$ of the left motor 7 by the vibration suppression correction torque amount $\Delta T_{Lm}$, affects by the power transmission path 19 constituting the turning moment control device 11, and thus the right non-interference part 63 performs predictive correction to add the decreasing interference torque amount to the output of the right motor ECU 30A.

Further, as shown in FIG. 2, an interference torque (K2 part of FIG. 2), where the output of the left motor 7 decreases by a torque amount obtained by integrating a predetermined interference coefficient (b2/(b1+1)) to the vibration suppression correction torque amount $\Delta T_{Rm}$ with an increase in the output $T_{Rm}$ of the right motor 9 by the vibration suppression correction torque amount $\Delta T_{Rm}$, affects by the power transmission path 19 constituting the turning moment control device 11, and thus the left non-interference part 65 also performs predictive correction to add the decreasing interference torque amount to the output of the left motor ECU 30B in the same manner.

Then, as shown in FIG. 2, a right non-interference correction amount $\Delta T_{Lm} b1/(b2+1)$ corrected by the right non-interference part 63 is additionally input to an adder-subtractor 67. Therefore, the request value of the right motor request torque $T_{Rm}^*$ which undergoes the first-stage correction by the adder-subtractor 57 using the vibration suppression correction torque amount $\Delta T_{Rm}$ further undergoes the second-stage correction by the adder-subtractor 67 using the right non-interference correction amount $\Delta T_{Lm} \cdot b1/(b2+1)$, obtaining the new request value $T_{Rm}^{**}$ of the right motor request torque.

Likewise, a left non-interference correction amount $\Delta T_{Rm} \cdot b2/(b1+1)$ corrected by the left non-interference part 65 is additionally input to an adder-subtractor 69. Therefore, the request value of the left motor request torque $T_{Lm}^*$ which undergoes the first-stage correction by the adder-subtractor 59 using the vibration suppression correction torque amount $\Delta T_{Lm}$ further undergoes the second-stage correction by the adder-subtractor 69 using the left non-interference correction amount $\Delta T_{Rm} b2/(b1+1)$, obtaining the new request value $T_{Lm}^{**}$ of the left motor request torque.

Then, the request value $T_{Rm}^{}$ of the right motor request torque is output to the right motor 9, and the right motor torque $T_{Rm}$ is output to the request value from the right motor 9. Further, the request value $T_{Lm}^{}$ of the left motor request torque is output to the left motor 7, and the left motor torque $T_{Lm}$ is output to the request value from the left motor 7. Then, via the power transmission path 19 of the turning moment control device 11, the right wheel torque $T_R$ is transmitted to the right axle 15 of the right wheel 5 and the left wheel torque $T_L$ is transmitted to the left axle 13 of the left wheel 3.

Next, the interference coefficient will be described. With the skeleton view of FIG. 4 showing the power transmission path 19 of the turning moment control device 11, when the right motor torque $T_{Rm}$ is applied to the right motor 9 and the left motor torque $T_{Lm}$ is applied to the left motor 7, the right wheel torque $T_R$ of the right wheel 5 and the left wheel torque $T_L$ of the left wheel 3 can, respectively, be represented by: Further, equations (1), (3) are, respectively, modified and can be represented by:

$$T_R = r \cdot (b2+1) \cdot T_{Rm} - r \cdot b1 \cdot T_{Lm} \quad (1)$$

Equation (1) is modified and represented by:

$$= r \cdot (b2+1)(T_{Rm} - b1/(b2+1) \cdot T_{Lm}) \quad (2)$$

$$T_L = r \cdot (b1+1) \cdot T_{Lm} - r \cdot b2 \cdot T_{Rm} \quad (3)$$

Equation (3) is modified and represented by:

$$= r \cdot (b1+1)(T_{Lm} - b2/(b1+1) \cdot T_{Rm}) \quad (4)$$

where r: a gear ratio calculated by the number of gears (input gears Zi, counter gears Zc, output gears Zo, differential drive gears Zd) from the motor to the differential mechanism 17 constituted with the planetary gear mechanism in FIG. 4;

b1: a gear ratio calculated by the number of gears (I/P sun gears Zs1, large pinion gears Zp1, small pinion gears Zp2, O/P sun gears Zs2) to the left wheel 3 in the differential mechanism 17 in FIG. 4; and b2: a gear ratio calculated by the number of gears (annulus gears Zr1, large pinion gears Zp1, small pinion gears Zp2, 0/P sun gears Zs2) to the right wheel 5 in the differential mechanism 17 in FIG. 4.

Figure 6A:
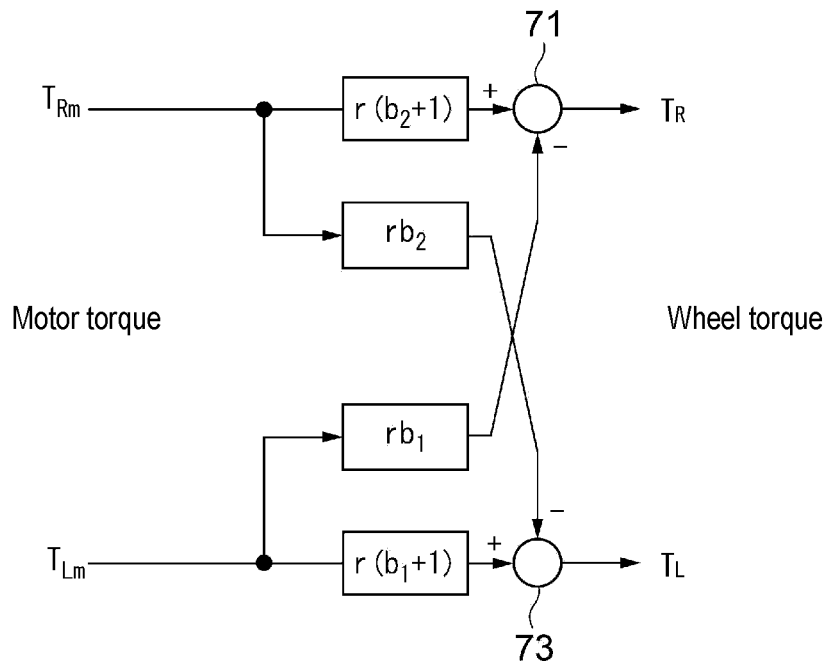
FIG. 6A is a torque flow diagram showing that the motor torques of the left and right motors flow to wheel axles of the left and right wheels, respectively.
Figure 6B:
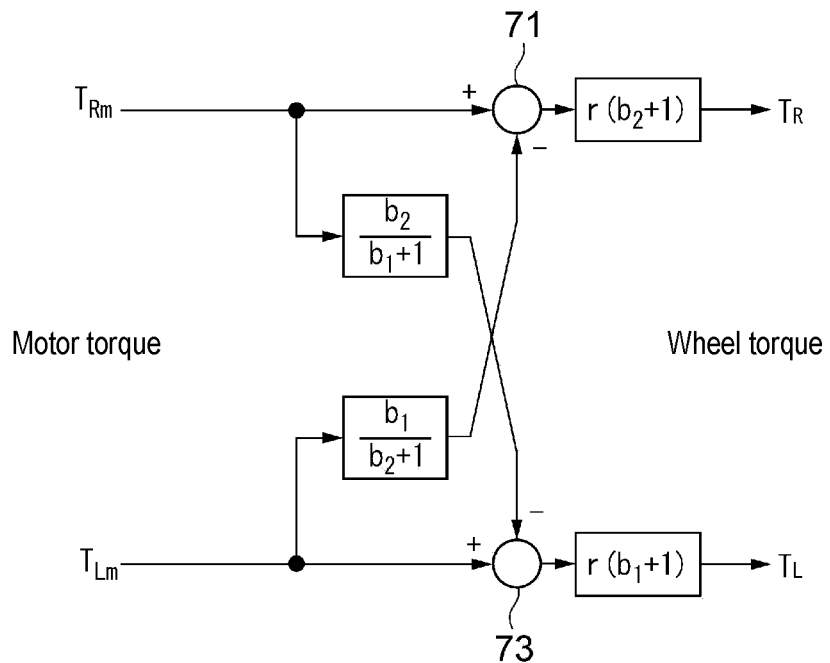
FIG. 6B is a torque flow diagram representing interference terms on a motor torque side in FIG. 6A.

A torque state of equation (1), (3) is shown in a torque flow diagram of FIG. 6A, and a torque state of equation (2), (4) where interference terms are represented on a motor torque side is shown in a torque flow diagram of FIG. 6B. It is found from the torque flow diagram of FIG. 6B that when the right motor torque $T_{Rm}$ is applied to the right motor 9 and the left motor torque $T_{Lm}$ is applied to the left motor 7, the decreasing (interference) torque of $T_{Lm}\cdot(b1/(b2+1))$ affects from the left motor 7 to the right motor 9, and the decreasing (interference) torque of $T_{Rm}\cdot(b2/(b1+1))$ affects from the right motor 9 to the left motor 7. The torque is input to the adder-subtractor 71, 73 of FIG. 6A), 6B as subtraction.

Therefore, the interference is performed where the right motor torque $T_{Rm}$ of the right motor 9 decreases by the torque amount obtained by integrating the predetermined interference coefficient (b1/(b2+1)) to the vibration suppression correction torque amount $\Delta T_{Lm}$ of the left motor 7 with the increase in the left motor torque $T_{Lm}$ of the left motor 7 by the vibration suppression correction torque amount $\Delta T_{Lm}$.

Likewise, the interference is performed where the left motor torque $T_{Rm}$ of the left motor 7 decreases by the torque amount obtained by integrating the predetermined interference coefficient (b2/(b1+1)) to the vibration suppression correction torque amount $\Delta T_{Rm}$ of the right motor 9 with the increase in the right motor torque $T_{Rm}$ of the right motor 9 by the vibration suppression correction torque amount $\Delta T_{Rm}$.

Therefore, in the power transmission path 19 of the turning moment control device 11, since the left/right mo torque is also transmitted to the axle of the opposite wheel and the interference is performed such that the opposite motor torque is decreased if one of the left and right motor torques increases, in anticipation of the change in motor torque by the interference, the non-interference correction part 61 of the left and right motor ECUs 30A, 30B predictively corrects the output to the interfered motor so as to cancel the interfered motor torque amount. Thus, it is possible to eliminate the trouble that the vibration suppression correction torques by the vibration suppression control in the left motor 7 and the right motor 9 interfere with each other.

According to the present embodiment described above, non-interference is performed by predictively correcting the output from the right motor ECU 30A or the left motor ECU 30B to the interfered motor so as to cancel the interference torque, making it possible to solve the problem that the vibration suppression control cannot be exerted due to divergence of the torque operation amounts of the right motor 9 and the left motor 7 and the problem that the vehicle behavior becomes unstable.

Further, with the right non-interference part 63 for predictively correcting the output of the right motor ECU 30A and the left non-interference part 65 for predictively correcting the output of the left motor ECU 30B, it is possible to prevent mutual interference between the vibration suppression control of the right motor 9 and the vibration suppression control of the left motor 7.

Furthermore, since the interference is performed where the output of the right motor decreases by the torque amount obtained by integrating the predetermined interference coefficient (b1/(b2+1)) to the vibration suppression correction torque amount $\Delta T_L$ with the increase in the output $T_{Lm}$ of the left motor 7 by the vibration suppression correction torque amount $\Delta T_{Lm}$, the right non-interference part 63 performs predictive correction to add the decreasing interference torque amount to the output of the right motor 9, and corrects the output from the right motor ECU 30A.

Moreover, since the interference is performed where the output of the left motor 7 decreases by the torque amount obtained by integrating the predetermined interference coefficient (b2/(b1+1)) to the vibration suppression correction torque amount $\Delta T_{Rm}$ with the increase in the output $T_{Rm}$ of the right motor 9 by the vibration suppression correction torque amount $\Delta T_{Rm}$, the left non-interference part 65 performs predictive correction to add the decreasing interference torque amount to the output of the left motor 7, and corrects the output from the left motor ECU 30B.

Thus, since the non-interference by the predictive correction can be performed by adding the torque amount obtained by integrating the predetermined interference coefficient to the vibration suppression correction torque amount $\Delta T_{Rm}$, $\Delta T_{Lm}$, it is possible to easily perform the non-interference.

Further, since the predetermined interference coefficient is calculated based on the gear ratio which is formed by the gear train of the power transmission path 19 constituting the turning moment control device 11, it is possible to easily set the interference coefficient.

Furthermore, even if the vibration suppression correction torque amounts of the right motor 9 and the left motor 7 are calculated by feedback control based on the rotation speeds of the motors, the rotation speed of the own motor is not interfered by the vibration suppression correction torque amount of the other motor, making it possible to improve stability of the vibration suppression control.

The interference coefficient in the present embodiment is set by taking the power transmission path 19 shown in the skeleton view of FIG. 4 as an example, and is not necessarily limited to the power transmission path shown in FIG. 4, but can be a power transmission path configured such that the output of the right motor and the output of the left motor are, respectively transmittable to the left and right wheels of the vehicle via the differential mechanism.

Further, as in FIG. 1, 2, the configuration is adopted which includes the right motor ECU 30A and the left motor ECU 30B in the one motor ECU 30. However, a configuration may be adopted which separately includes the right motor ECU 30A for the right motor 9 and the left motor ECU 30B for the left motor 7.

INDUSTRIAL APPLICABILITY

According to at least one embodiment of the present invention, it is possible to effectively exert vibration suppression control of preventing mutual interference, where an output of a first motor and an output of a second motor each interfere with the output of the other motor via a power transmission path from the motors to left and right wheels, to suppress an excessive fluctuation in motor rotation speed. Thus, the present invention can suitably be applied to a motor control device for an electric vehicle.

REFERENCE SIGNS LIST

1 Vehicle (electric vehicle)
3 Left wheel
5 Right wheel
7 Left motor (second motor)
9 Right motor (first motor)
11 Turning moment control device
13 Left axle
15 Right axle
17 Differential mechanism 19 Power transmission path
25 Left inverter
27 Right inverter
29 Battery
30 Motor ECU (motor control device)
30A Right motor ECU (first motor control part)
30B Left motor ECU (second motor control part)
40 Vehicle ECU
41 Left rotation speed sensor
43 Right rotation speed sensor
49 Right motor vibration suppression part (first motor vibration suppression part)
51 Left motor vibration suppression part (second motor vibration suppression part)
53 Vibration suppression right torque computation part
55 Vibration suppression left torque computation part
57, 59, 67, 69, 71, 73 Adder-subtrator
61 Non-interference correction part
63 Right non-interference part (first non-interference part)
65 Left non-interference part (second non-interference part)
K1 Interference torque from left motor to right motor
K2 Interference torque from right motor to left motor

The invention claimed is:

1. A motor control device for an electric vehicle which includes a power transmission path configured such that an output of a left motor and an output of a right motor are, respectively, transmittable to left wheel and right wheel of the vehicle via a differential mechanism;
wherein, in a collinear graph of the power transmission path, which has an abscissa representing the left motor, the left wheel, the right wheel, and the right motor in sequence at intervals of a gear ratio of the gears constituting sections between the respective elements, and an ordinate representing the respective rotation speeds, the rotation speeds of the left motor, the left wheel, the right wheel, and the right motor have a collinear relationship where they are positioned on the same straight line;
the motor control device comprising:
a first motor control part for controlling the output of the right motor based on a request value of the right motor request torque;
a second motor control part for controlling the output of the left motor based on a request value of the left motor request torque;
wherein the first motor control part includes a first motor vibration suppression part that corrects the right motor required torque so that the rotation speed of the right motor does not fluctuate beyond a predetermined range;
wherein the second motor control part includes a second motor vibration suppression part that corrects the left motor required torque so that the rotation speed of the left motor does not fluctuate beyond the predetermined range;
wherein the first motor control part includes a first non-interference part that further corrects the right motor required torque corrected by the first motor vibration suppression part so as to cancel out a change in interference torque due to a correction torque amount of the first motor vibration suppression part; and
wherein the second motor control part includes a second non-interference part that further corrects the left motor required torque corrected by the second motor vibration suppression part so as to cancel out a change in interference torque due to a correction torque amount of the second motor vibration suppression part.

2. The motor control device for the electric vehicle according to claim 1,
wherein the power transmission path constitutes a turning moment control device capable of controlling a turning moment by controlling the respective outputs of the right motor and the left motor to adjust a sharing ratio of a driving torque in the left wheel and right wheel.

3. The motor control device for the electric vehicle according to claim 1,
wherein the first non-interference part further corrects the right motor required torque corrected by the first motor vibration suppression part when the motor output of the right motor changes according to the correction torque amount of the first vibration suppression part; and
wherein the second non-interference part further corrects the left motor required torque corrected by the second motor vibration suppression part when the motor output of the left motor changes according to the correction torque amount of the second vibration suppression part.

4. The motor control device for the electric vehicle according to claim 3,
wherein a correction amount of the first non-interference part is a torque amount obtained by multiplying the correction torque amount of the second motor vibration suppression part by a predetermined first interference coefficient; and
wherein a correction amount of the second non-interference part is a torque amount obtained by multiplying the correction torque amount of the first motor vibration suppression part by a predetermined second interference coefficient.

5. The motor control device for the electric vehicle according to claim 4,
wherein the first interference coefficient and the second interference coefficient are calculated based on a gear ratio which is formed by a gear train constituting the power transmission path.

6. The motor control device for the electric vehicle according to claim 1,
wherein the first motor vibration suppression part calculates a correction amount of the right motor required torque by feedback control based on a rotation speed of the right motor; and
wherein the second motor vibration suppression part calculates a correction amount of the left motor required torque by feedback control based on a rotation speed of the left motor.

* * * * *